(12) United States Patent
Moosheimer et al.

(10) Patent No.: US 9,028,934 B2
(45) Date of Patent: May 12, 2015

(54) LABEL WITH BENDABLE PART

(75) Inventors: Ulrich Moosheimer, Hohenkammern (DE); Josef Mair, Altomuenster (DE)

(73) Assignee: Schreiner Group GmbH & Co. KG, Oberschleissheim (DE)

( * ) Notice: Subject to any disclaimer, the term of this patent is extended or adjusted under 35 U.S.C. 154(b) by 625 days.

(21) Appl. No.: 12/311,926

(22) PCT Filed: Sep. 26, 2007

(86) PCT No.: PCT/EP2007/060205
§ 371 (c)(1),
(2), (4) Date: Aug. 7, 2009

(87) PCT Pub. No.: WO2008/046722
PCT Pub. Date: Apr. 24, 2008

(65) Prior Publication Data
US 2009/0291240 A1    Nov. 26, 2009

(30) Foreign Application Priority Data

Oct. 18, 2006   (DE) .......................... 10 2006 049 042

(51) Int. Cl.
| | | |
|---|---|---|
| *G06K 19/06* | (2006.01) | |
| *G09F 3/00* | (2006.01) | |
| *G06K 19/077* | (2006.01) | |
| *G09F 3/10* | (2006.01) | |
| *G09F 3/02* | (2006.01) | |

(52) U.S. Cl.
CPC ....... *G09F 3/0295* (2013.01); *Y10T 428/24628* (2015.01); *Y10T 428/13* (2015.01); *Y10T 428/24273* (2015.01); *G06K 19/0776* (2013.01); *G09F 3/10* (2013.01); *G09F 2003/0272* (2013.01); *G09F 2003/0273* (2013.01)

(58) Field of Classification Search
USPC .................................... 40/310, 316; 428/35.7
See application file for complete search history.

(56) References Cited

U.S. PATENT DOCUMENTS

| | | | |
|---|---|---|---|
| 4,656,767 A | | 4/1987 | Tarrant |
| 4,921,277 A | * | 5/1990 | McDonough .................. 283/81 |
| 5,389,701 A | * | 2/1995 | Erickson ..................... 522/158 |
| 6,036,234 A | * | 3/2000 | Chess ......................... 283/101 |
| 6,125,563 A | * | 10/2000 | Girerd ........................... 40/310 |
| 6,857,801 B2 | | 2/2005 | Van Bever |
| 7,703,687 B2 | * | 4/2010 | Barczyk et al. ............... 235/492 |

(Continued)

FOREIGN PATENT DOCUMENTS

| | | |
|---|---|---|
| DE | 100 17 142 | 10/2001 |
| EP | 1 803 086 B1 | 7/2013 |

(Continued)

OTHER PUBLICATIONS

International Search Report.

(Continued)

*Primary Examiner* — Ellen S Wood
(74) *Attorney, Agent, or Firm* — Collard & Roe, P.C.

(57) ABSTRACT

A label has a part that is to stand out at a defined angle from a curved surface to which the label is applied. There is a reinforcement area that has an edge curvature at the transition part of the label, between the part that is to be raised up and the part that is attached to the curved surface. The edge curvature is implemented such that it fixes the part to be raised up at a defined angle during or after placement of the label on a specific object.

27 Claims, 4 Drawing Sheets

(56) References Cited

U.S. PATENT DOCUMENTS

2002/0121037 A1    9/2002    Cochran et al.
2007/0146140 A1*    6/2007    Nagao et al. ............... 340/572.8

FOREIGN PATENT DOCUMENTS

| | | |
|---|---|---|
| GB | 2 366 279 | 3/2002 |
| JP | 59-96138 | 6/1984 |
| JP | 08-276014 | 10/1996 |
| JP | 10-105065 | 4/1998 |
| JP | 3053639 | 8/1998 |
| JP | 2003-043919 | 2/2003 |
| JP | 2005-17671 | 1/2005 |
| JP | 2006-227037 | 8/2006 |
| JP | 2006-277524 | 10/2006 |
| JP | 2007-225946 | 9/2007 |
| NL | 1 000 785 | 1/1997 |
| WO | WO2006/04539 | 5/2006 |

OTHER PUBLICATIONS

DIN 53121, Dec. 1996; 7 pages (with English Abstract).
Translation of JP59-96138 (Foreign Patent Previously Submitted).

* cited by examiner

LABEL WITH BENDABLE PART

CROSS-REFERENCE TO RELATED APPLICATIONS

Applicants claim priority under 35 U.S.C. §119 of German Application No. 10 2006 049 042.8, filed Oct. 18, 2006. Applicants also claim priority under 35 U.S.C. §365 of PCT Application No. PCT/EP2007/060205 filed Sep. 26, 2007. The international application under PCT article 21(2) was not published in English.

BACKGROUND OF THE INVENTION

The invention concerns a label with a structure that enables sticking it to curved structures, and to subsequently place a part of the label at a defined angle from the curved surface.

Such a label part, sticking out from a surface at a defined angle, can be useful for various tasks. With a label stuck on a tube, for example, this label part can contain information concerning the medium conveyed in the tube or the technical state of the tube. Readability is facilitated, in this case, with the information part sticking out away from the tube. Another area of application for a label part protruding, in a defined manner, from a curved surface, concerns RFID (Radio Frequency Identification) labels, whose readability on metal surfaces is limited. By means of a label region raised up in a defined manner, the RFID components of such labels can be permanently distanced from the surface, whereby the electronic readability—as described, for example, in German Offenlegungsschrift DE 10017142 A1—is ensured. Other applications of the principle are in the needle protection devices integrated in syringe labels, which must be folded away, in a defined manner, from the syringe by the doctor.

A disadvantage of the solution known from DE 10017142 is that additional folds are required to fix the label in a defined position.

For the aforementioned application fields, however, a label with an area that requires no additional manipulations and that can be bent in a defined manner is desirable.

SUMMARY OF THE INVENTION

The goal of the invention is to implement such a label that can be handled as simply and reliably as possible.

In accordance with one aspect of the invention, the label is attachable to a curved surface, with a section that can be bent. A part of a label that should stick out at a defined angle from the curved surface has, in accordance with the invention, a reinforcement area, which has an edge curvature at the transition between a part of the label used for the attachment and the part to be raised up; this edge curvature is implemented in such a way that it achieves a fixing of the part to be raised up, at a defined angle, during or after placement of the label on an intended object.

The reinforcement area can be formed by a partial curing or solidification of a film or by a reinforcement of the label with an appropriately formed film part. Preferably, the reinforcement area has a bending resistance according to DIN 53121 above 1 mNm, or above 2 mNm, particularly preferably, above 5 mNm.

The reinforcement area can also be produced by a local increase in the rigidity. Weakenings or perforations can be provided along one or more curves in the section that can be bent. The local increase in rigidity is effected by local physical or chemical treatment, or by irradiation with electromagnetic or particle beams. For example, the local increase in rigidity can occur due to the effect of a chemical substance.

The reinforcement area can also be formed by a film part that is attached by self-adhesion to the section that can be bent. For example, the reinforcement area can be attached on the side of the label opposite from the object to be labeled, or on the side of the label facing the object to be labeled.

The invention also relates to a body with a curved surface and a label attached thereon with a section that can be bent. A reinforcement area is located in the section that can be bent; the edge of the reinforcement area fitting against the curved surface in the bent state is formed such that the section that can be bent, can be fixed at a defined angle ($\alpha$).

In one embodiment, the body has a cylindrical form, and is tubular. For example, the body could be a syringe that is connected with a protective device for needles.

BRIEF DESCRIPTION OF THE DRAWINGS

The invention is described below with the aid of the purely schematic drawings, which are not true-to-scale.

DETAILED DESCRIPTION OF THE EMBODIMENTS

The term "curved surfaces" is intended below to mean all surfaces that have a curvature in the area of the raising-up axis of the label, but especially surfaces of extrusion bodies with a round or elliptical cross-section and here, in particular, cylinders (tubes). The term label is understood to mean all film-like information carriers that can be bonded to the object to be labeled. In addition to adhesion (self-adhesive labels), all other common bonding techniques, such as permanent cementing, welding, stapling, riveting, etc., can also be taken into consideration.

Figure 1:
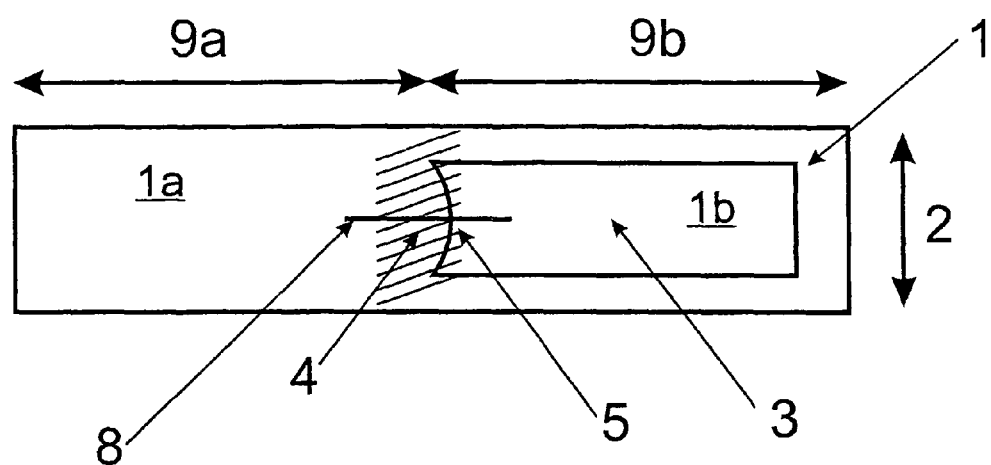
FIG. 1 shows the fundamental structure of a label according to an embodiment of the invention.

FIG. 1 shows the fundamental structure of a label 1 in accordance with the invention. The label 1, to be affixed later on the surfaces curved in direction 2 (transverse to extension 9a, 9b), consists of two partial areas 1a and 1b, which are defined by a crease area 4 and the left end of a reinforcement area 3. The crease area 4 can be formed by a weakening of the label material 1 (scoring, perforation, or the like), or be predetermined merely by the end of the reinforcement area 3, without additional weakening of the label material. The reinforcement area 3 has a defined edge curvature 5 at the end adjacent to the crease area; the edge curvature is selected such that, in the raised up state of the partial area 1b, it fits close to the curvature of the curved surface beneath. In order to guarantee this, the reinforcement area 3 must be sufficiently rigid, whereas the material of the label 1 must be flexible enough to absorb the expansions/compressions of the film material 1 formed when the label part 1b is raised up. As materials for the label 1, PP, PE, or PET can be considered in particular, while the reinforcement part is preferably made of PET, PP, PE or also cardboard or the like. The reinforcement area 3 can be effected by the bonding of a reinforcement part 3 made of a second rigid film layer with the label 1, or by the curing of the existing label 1 in area 3.

With the separate film layer, all known bonding variants known to the specialist, in particular, however, a self-adhesive bonding, can be considered for the bonding with the label 1. For curing the area 3, film materials whose rigidity can be increased by local physical or chemical treatment are suitable. The design of the defined curvature 5 and the material combination for the label 1 and the reinforcement area 3 make possible adjusting the defined angle, as well as the forces for folding up and closing the area that can be raised up.

The forces for folding up and closing the area that can be raised up can also be influenced by weaknesses or perforations 8. As an example, FIG. 1 shows a press cut line, transverse to the curvature 5. The press cutting leads to a better dismantling of the discardings of the films in the crease area 4 when folding. In this way, the force that must be expended to reach the end position of the raised-up area is reduced. Alternatively, several parallel weakenings/perforations, or also weakenings/perforations parallel to the curvature 5, are also suitable.

Figure 2:
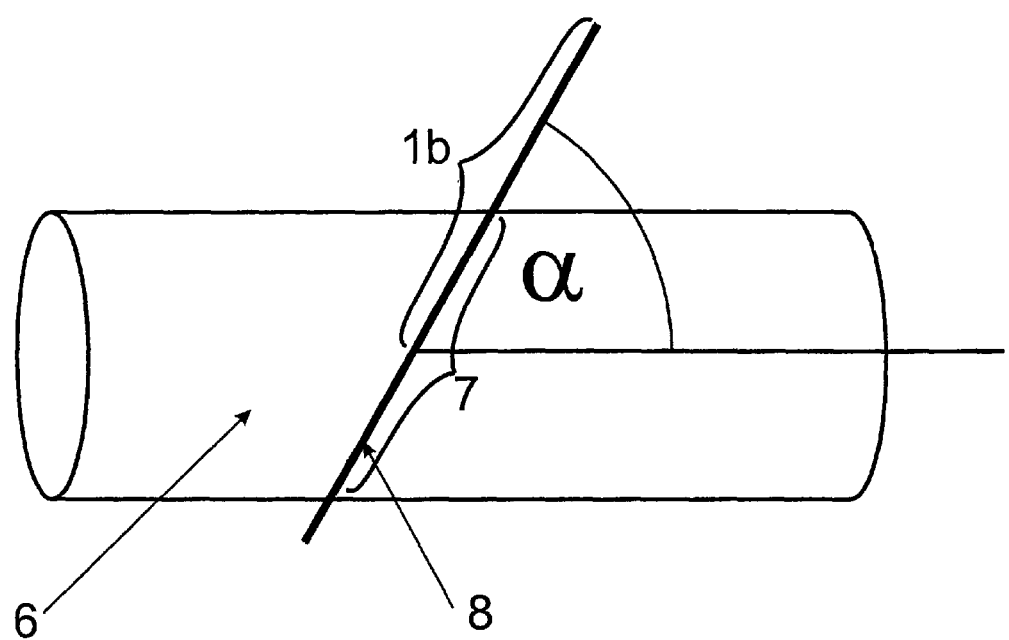
FIG. 2 shows the shape of the edge curvature of the reinforcement part of the label from FIG. 1.

FIG. 2 illustrates how the edge curvature 5 (FIG. 1) of the reinforcement part 3 is shaped to obtain a raising up of the label part 1*b* at a defined angle α from the surface of a curved surface 6—here, to simplify the depiction—a cylindrical surface. The edge curvature 5 (FIG. 1) results from determining, for a prespecified angle α, the intersecting plane 7 of a plane 8 with the cylindrical body 6.

Figure 3:
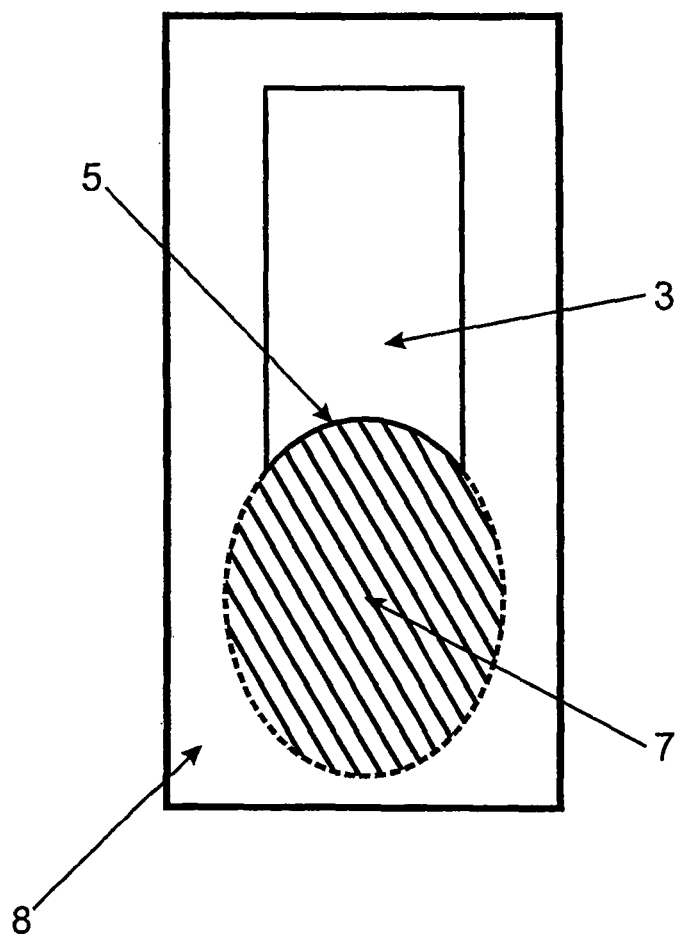
FIG. 3 shows a suitable dimensioning of the edge curvature.

FIG. 3 shows this intersecting plane 7 as a shaded area in plane 8. According to FIG. 3, the edge curvature 5 of the reinforcement part 3 is produced as a segment of the limit line of intersecting plane 7. Due to the rigidity of the reinforcement part 3, in particular in the area of the curvature 5, it is possible for the raised up area 1*b* of the label to stand out from the cylindrical body 6 at a specified angle. If the curvature radius of the edge curvature 5 is selected to match the radius of the cylindrical body 6, an adjusted angle α of 90 degrees results.

Figure 4:
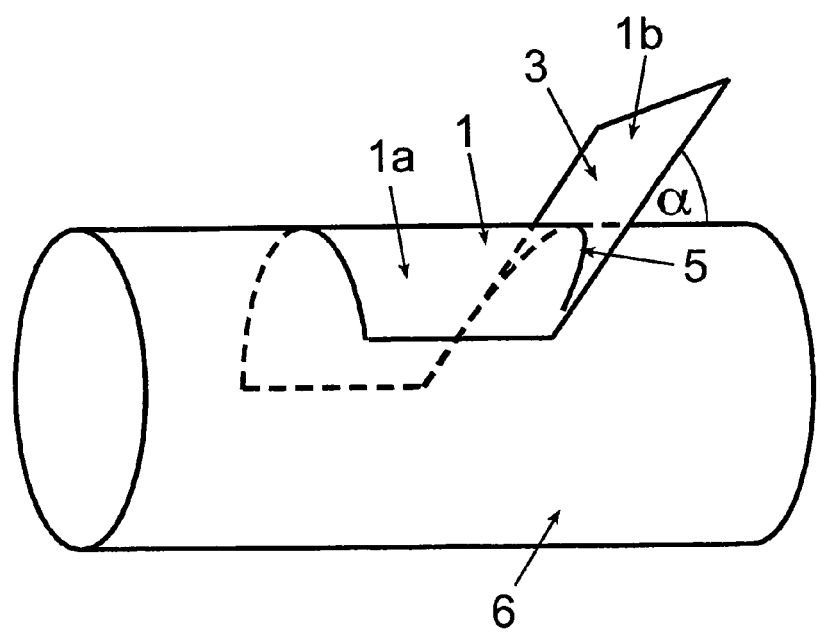
FIG. 4 shows a label stuck on a cylindrical tube.

FIG. 4 shows such a label stuck on a cylindrical tube. One can see how the defined curvature 5 (FIG. 3) holds the area 1*b* of the label that can be raised up at a defined angle α. Moreover, a rigid reinforcement part 3, lying flat, ensures that the raised up area 1*b* of the label forms a planar area (that, where necessary, can be read well). The reinforcement part 3 is merely alluded to in FIG. 4. The area 1*a* of the label can also be formed substantially wider, transverse to the tube axis, than the area 1*b*, so that in this area, for example, the labeling can be carried out all the way around, or over and around the cylindrical body (an end of the label is wrapped once around the cylinder, again cemented at its starting area).

The invention claimed is:

1. A label that is attachable to a curved surface, comprising:
   a label section attachable to a curved surface,
   a section that can be bent and thereby raised up and folded up from the label section,
   an edge between said label section and said section that can be bent, and
   a reinforcement area located near the edge,
   wherein the edge between said label section and said section that can be bent is curved and wherein when the label is attached to the curved surface, the section that can be bent is configured to be raised up and folded up from the label section at a defined angle relative to the label section,
   wherein said edge is configured to hold said section that can be bent at said defined angle, and
   wherein the label further comprises at least one weakening or perforation near the edge, the weakening or perforation being disposed transverse to the edge.

2. The label according to claim 1, wherein the reinforcement area has a defined edge curvature, which curves around the curved surface and wherein said edge curvature of said reinforcement area and said edge between the label section and said section that can be bent are configured to fix said section that can be bent at said defined angle.

3. The label according to claim 1, wherein the reinforcement area is produced by a local increase in rigidity of the section that can be bent.

4. The label according to claim 1, wherein the at least one weakening or perforation comprises several weakenings or perforations.

5. The label according to claim 3, wherein the local increase in rigidity is effected by irradiation with electromagnetic or particle beams.

6. The label according to claim 3, wherein the local increase in rigidity is caused by application of a chemical substance.

7. The label according to claim 2, wherein the reinforcement area is formed by a film part that is attached by self-adhesion to the section that can be bent.

8. The label according to claim 2, wherein the reinforcement area is attached on a side of the label opposite from a side of the label to be affixed to the curved surface.

9. The label according to claim 2, wherein the reinforcement area is attached on a side of the label that is to be affixed to the curved surface.

10. A body with a curved surface and a label attached thereon the label comprising:
    a label section attachable to a curved surface,
    a section that can be bent and thereby raised up and folded up from the label section,
    an edge between said label section and said section that can be bent, and
    a reinforcement area located near the edge,
    wherein the edge between said label section and said section that can be bent is curved and wherein when the label is attached to the curved surface, the section that can be bent is configured to be raised up and folded up from the label section at a defined angle relative to the label section,
    wherein said edge is configured to hold said section that can be bent at said defined angle, and
    wherein the label further comprises at least one weakening or perforation near the edge, the weakening or perforation being disposed transverse to the edge.

11. The body according to claim 10, wherein the body has at least one of a cylindrical form or a tubular form.

12. The body according to claim 10, wherein the reinforcement area has a defined edge curvature, which curves around the curved surface and wherein said edge curvature of said reinforcement area and said edge between the label section and said section that can be bent are configured to fix said section that can be bent at said defined angle.

13. The body according to claim 11, wherein the body is a syringe.

14. The body according to claim 13, wherein the label is connected with a protective device for needles on the syringe.

15. The label according to claim 1, wherein the reinforcement area of the section that can be bent lies flat so that the section that can be bent forms a planar area.

16. The body according to claim 10, wherein the reinforcement area of the section that can be bent lies flat so that the section that can be bent forms a planar area.

17. A label that is attachable to a curved surface, the surface extending in a longitudinal direction, the label comprising:
    a label section attachable to a curved surface;
    a section that can be bent and thereby raised up and folded up from the label section;

an edge between said label section and said section that can be bent, and a reinforcement area located near the edge, wherein the edge between the label section and said section that can be bent is curved and wherein the section that can be bent is configured to be raised up and folded up from the label section at a defined angle relative to the label section, and wherein the reinforcement area is a film part attached to the section that can be bent, wherein the edge extends transverse to the longitudinal direction of extension of the curved surface, and wherein the label further comprises at least one weakening or perforation near the edge, the weakening or perforation being disposed transverse to the edge.

18. The label as in claim 17, wherein the reinforcement area is produced by a local increase in rigidity;

wherein the reinforcement area is formed by a film part that is attached by self-adhesion; and wherein the reinforcement area is attached on a side of the label opposite from a side of the label to be affixed to the curved surface.

19. The label as in claim 17, wherein the edge between the label section and the section that can be bent is curved in a substantially circular manner, wherein the reinforcement area has a defined edge curvature which curves around the curved surface, and wherein said edge curvature of said reinforcement area is configured to fix said section that can be bent at a defined angle.

20. The label as in claim 17, wherein the reinforcement area is attached on a side of the label that is to be affixed to the curved surface.

21. A label that is attachable to a curved surface, the surface extending in a longitudinal direction, the label comprising:

a label section attachable to the curved surface, a section that can be bent and thereby raised up and folded up from the label section, an edge between said label section and said section that can be bent, and a reinforcement area located near the edge, wherein the reinforcement area is a film part attached to the section that can be bent, and wherein said reinforcement area is substantially flat, wherein the edge between the label section and said section that can be bent fits against the curved surface and is curved around the curved surface and is in a bent state, wherein the edge extends substantially transverse to the longitudinal direction of extension of the curved surface, and wherein the label further comprises at least one weakening or perforation near the edge, the weakening or perforation being disposed transverse to the edge.

22. The label as in claim 21, wherein the reinforcement area has a defined edge curvature, which curves around the curved surface and wherein said edge curvature of said reinforcement area is configured to fix said section that can be bent at a defined angle.

23. The label as in claim 1, wherein said reinforcement area is located at least partially in the section that can be bent.

24. The label as in claim 10, wherein said reinforcement area is located at least partially in the section that can be bent.

25. The label as in claim 17, wherein said reinforcement area is located at least partially in the section that can be bent.

26. The label as in claim 21, wherein said reinforcement area is located at least partially in the section that can be bent.

27. The label according to claim 1, wherein the at least one weakening or perforation is a press cut line.

\* \* \* \* \*